United States Patent
Sandvik

Patent Number: 5,181,758
Date of Patent: Jan. 26, 1993

[54] VEHICLE SEAT ARRANGEMENT

[75] Inventor: Lars V. Sandvik, Vargarda, Sweden

[73] Assignee: General Engineering (Netherlands) B.V., Utrecht, Netherlands

[21] Appl. No.: 746,660

[22] Filed: Aug. 16, 1991

[30] Foreign Application Priority Data

Aug. 17, 1990 [GB] United Kingdom ............... 9018119

[51] Int. Cl.[5] ............................ B60N 2/20; B60N 2/48
[52] U.S. Cl. .................................... 296/68.1; 297/216; 297/379; 297/408; 297/483; 280/808
[58] Field of Search .............................. 296/65.1, 68.1; 297/216, 379, 391, 408, 483; 280/808

[56] References Cited

U.S. PATENT DOCUMENTS

| | | | |
|---|---|---|---|
| 3,065,029 | 11/1962 | Spound et al. | 297/391 |
| 3,888,540 | 6/1975 | Protze et al. | 297/391 X |
| 4,512,604 | 4/1985 | Maeda et al. | 296/68.1 |
| 5,044,683 | 9/1991 | Parsson | 296/68.1 X |

FOREIGN PATENT DOCUMENTS

| | | |
|---|---|---|
| 0036934 | 10/1981 | European Pat. Off. . |
| 0115972 | 8/1984 | European Pat. Off. . |
| 2358193 | 6/1975 | Fed. Rep. of Germany . |
| 2802373 | 7/1979 | Fed. Rep. of Germany ...... 297/379 |
| 2388693 | 11/1978 | France . |
| 57-164820 | 10/1982 | Japan . |

Primary Examiner—Dennis H. Pedder
Attorney, Agent, or Firm—Spencer, Frank & Schneider

[57] ABSTRACT

A rear or bench seat in a motor vehicle such as a "Estate car", "station-wagon" or "hatch-back" is adapted to be folded down. A locking mechanism is provided to lock the back seat in the operative position. The locking mechanism comprises a locking element which extends substantially across the whole width of the vehicle in which the seat is fitted, which is mounted on the back of the seat. The locking element has means adapted to engage an abutment located on each side of the motor car when in the locking position. The locking element can be moved to a release position.

13 Claims, 5 Drawing Sheets

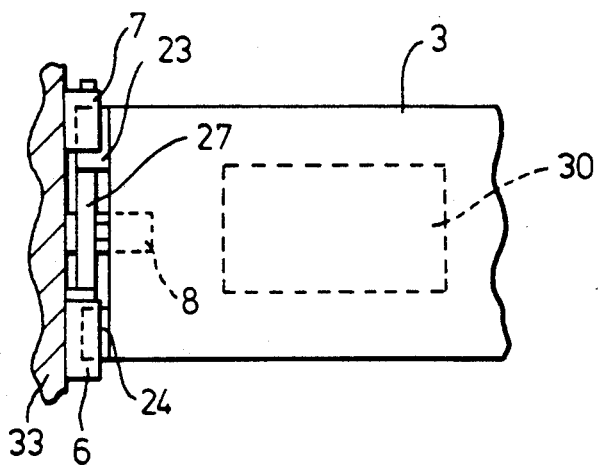
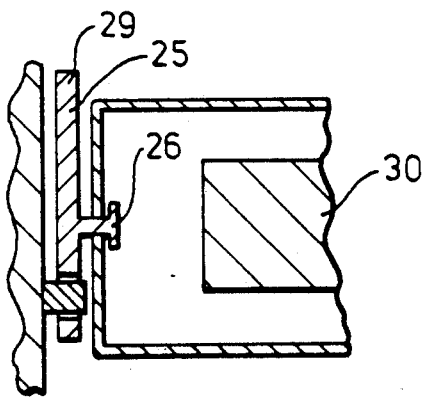
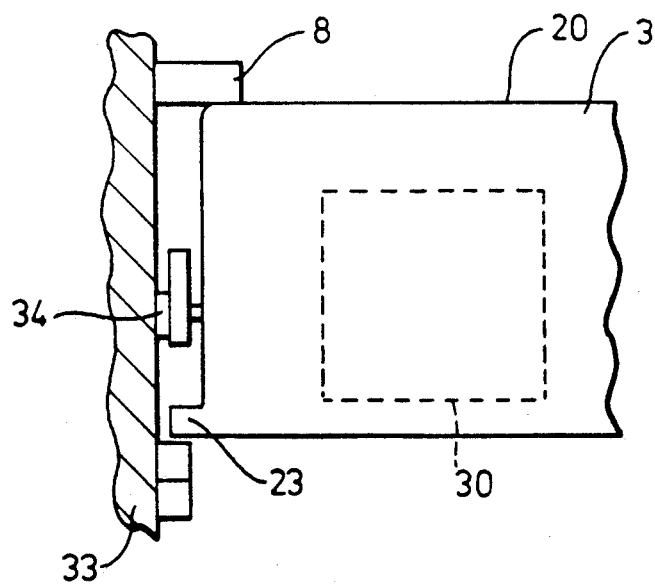

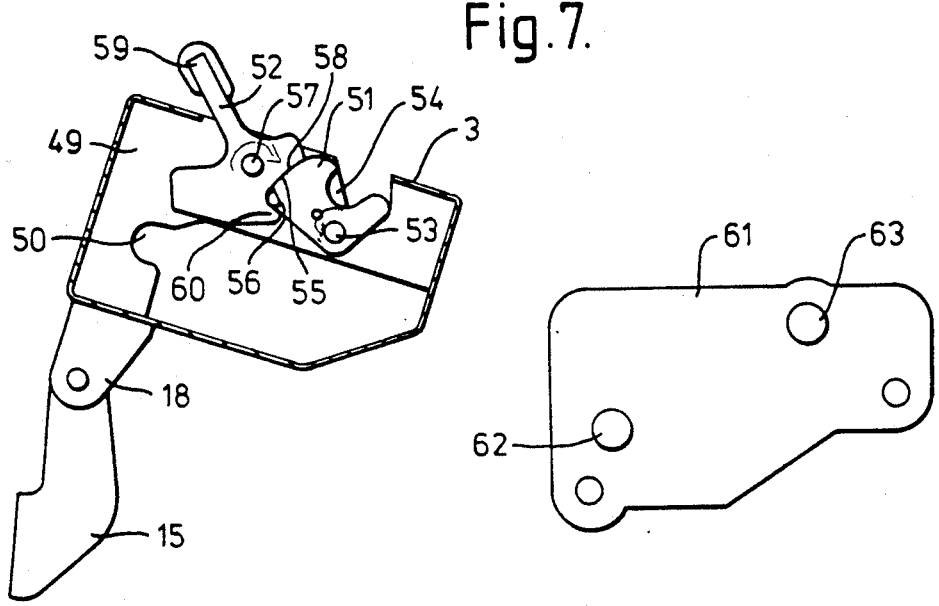
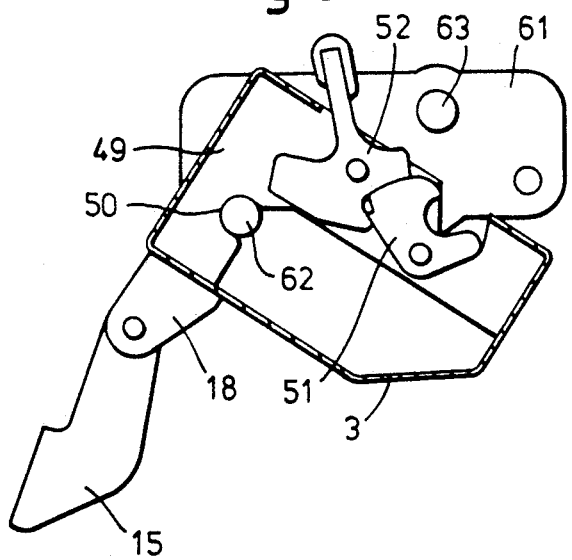
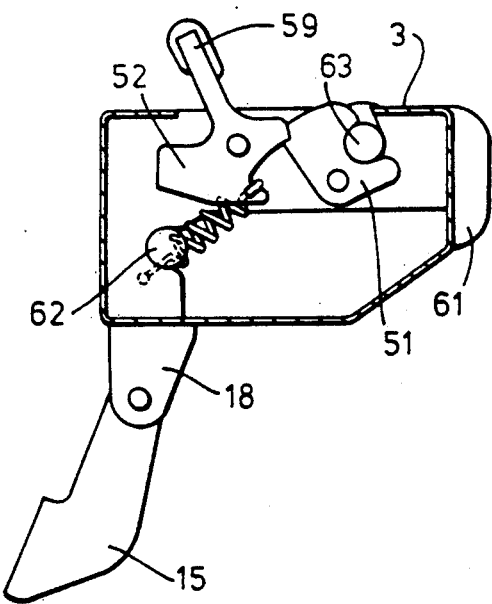

VEHICLE SEAT ARRANGEMENT

BACKGROUND TO THE INVENTION

THE PRESENT INVENTION relates to a vehicle seat arrangement and more particularly relates to a rear or bench seat of a motor vehicle which has a tilting back.

In this Specification the term "vehicle seat" will mean a vehicle seat which has a squab and which has a back, the back extending substantially across the entire width of the vehicle. A typical vehicle seat of this type may be found as the back-seat of a so-called "Estate" car, "station-waggon" or "hatch-back" car, and in many cases the seat may be folded in such a way as to increase the luggage carrying space present in the car. However, the invention is not confined to this particular application.

DESCRIPTION OF THE PRIOR ART

It has been proposed previously to provide the back of a vehicle seat as defined in this Specification with a locking arrangement which serves to lock the seat in a substantially upright position. Typically the locking arrangement includes a separate locking mechanism provided on each side of the back of the seat, to engage with locking stations or the like mounted on the two opposed sides of the vehicle.

In many situations it is essential that the back of the seat, as described, is properly secured at both sides of the vehicle. If two separate locking arrangements are utilised it is possible that whilst one locking arrangement may operate, thus preventing the back of the seat from tipping forwardly, the other locking arrangement may not be engaged. This can lead to a dangerous situation, especially if a safety-belt or a safety-belt retractor is fixed or anchored to the back of the seat.

It is to be noted that it is becoming more common for safety-belt retractors to be incorporated in the seats of a motor vehicle, and in a typical "Estate" car, "station-waggon" or "hatch-back" car situation a back seat may accommodate three people. This means that the back of the seat may have three retractors incorporated in it, although if retractors are mounted on or associated with the window posts of the vehicle, the back of the seat may have only a single substantially central retractor associated with it.

In any event it is to be noted that at least one retractor is mounted on the back of the seat and it is to be understood that under accident circumstances a severe force may be applied to this retractor. If only one side of the seat is correctly anchored in position, this may lead to the back of the seat being deformed, and/or may lead to the side of the back of the seat that is anchored in position breaking away from that anchorage, thus permitting the back of the seat to move forwardly. If the back of the seat moves forwardly the retractor mounted on the back of the seat will move forwardly, with potentially fatal results.

OBJECT OF THE INVENTION

Thus the present invention primarily seeks to provide a locking mechanism for the back of a seat as herein described which, in operation, will ensure that the back of the seat is securely locked in the operative position.

BRIEF SUMMARY OF THE INVENTION

According to this invention there is provided a locking mechanism for the back of a vehicle seat, the back of the seat being adapted to be moved from a substantially upright operative position to a forwardly tilted inoperative position, the locking mechanism being adapted to lock the back of the seat in the operative position, wherein the locking mechanism comprises a locking element extending substantially across the whole width of a vehicle in which the seat is fitted, and being mounted on the back of the seat, the locking element having means adapted to engage abutments located on each side of the motor vehicle, the locking element being movable between a locking position and a release position, the locking element, when in the locking position, engaging the abutments provided on each side of the vehicle.

Preferably the locking element consists of a cross-beam pivotally mounted on the back of the seat, the pivot axis being parallel to the beam so that the beam can only move in parallelism with the pivot axis thereof.

In one embodiment the locking element is spring-biassed towards its locked position.

Alternatively the locking element is spring-biassed towards its released position, and a secondary locking means is provided to prevent the locking element from moving to its released position.

In one embodiment the secondary locking means comprises a hook-like member engageable with a respective abutment.

Alternatively the secondary locking means comprises a first catch element adapted to move pivotally to a position in which it engages one of said abutments and a second catch element adapted to retain the first catch element in the abutment engaging position.

Conveniently each end of the movable locking element is provided with two projections, each side of the vehicle being provided with two spaced abutments, each abutment being adapted to engage a respective projection.

Preferably at least one abutment is provided with an inclined face adapted to engage the projection in order to retain the beam in the locking condition.

Conveniently a further abutment is provided on each side of the vehicle engageable with a rear face of the locking element and adapted to tilt the locking element into the locking position.

Preferably a retractor mechanism is mounted in position on the locking element.

Conveniently the webbing strap form the retractor mechanism passes between the two said abutments.

Preferably the locking element is pivotally mounted on two pivot arms which are pivotally mounted on the back of the seat.

Conveniently means are provided for adjusting the angle between the pivot arms and the back of the seat when the back of the seat is tilted forwardly.

Preferably a head-rest is mounted on the locking element.

INTRODUCTION TO THE DRAWINGS

In order that the invention may be more readily understood, and so that further features thereof may be appreciated, the invention will now be described by way of example with reference to the accompanying drawings in which FIG. 1 is a side view of a vehicle seat with a locking mechanism in accordance with the invention, FIG. 2 is an enlarged view of the transverse locking element of an embodiment of the invention, FIG. 3 is a view taken on the line III—III of FIG. 2, FIG. 4 is a view taken on the line IV—IV of FIG. 2, FIG. 5 is a view taken on the line V—V of FIG. 2, FIG. 6 is a view illustrating the apparatus of the invention in operation, FIG. 7 is a diagrammatic view of an alternative embodiment of the invention with the locking element separated from the abutments, FIG. 8 illustrates the embodiment of FIG. 7 with the locking element partially engaged with the abutments, and FIG. 9 illustrates the embodiment of FIG. 7 with the locking element fully engaged with the abutments.

DESCRIPTION OF PREFERRED EMBODIMENTS

Figure 1:
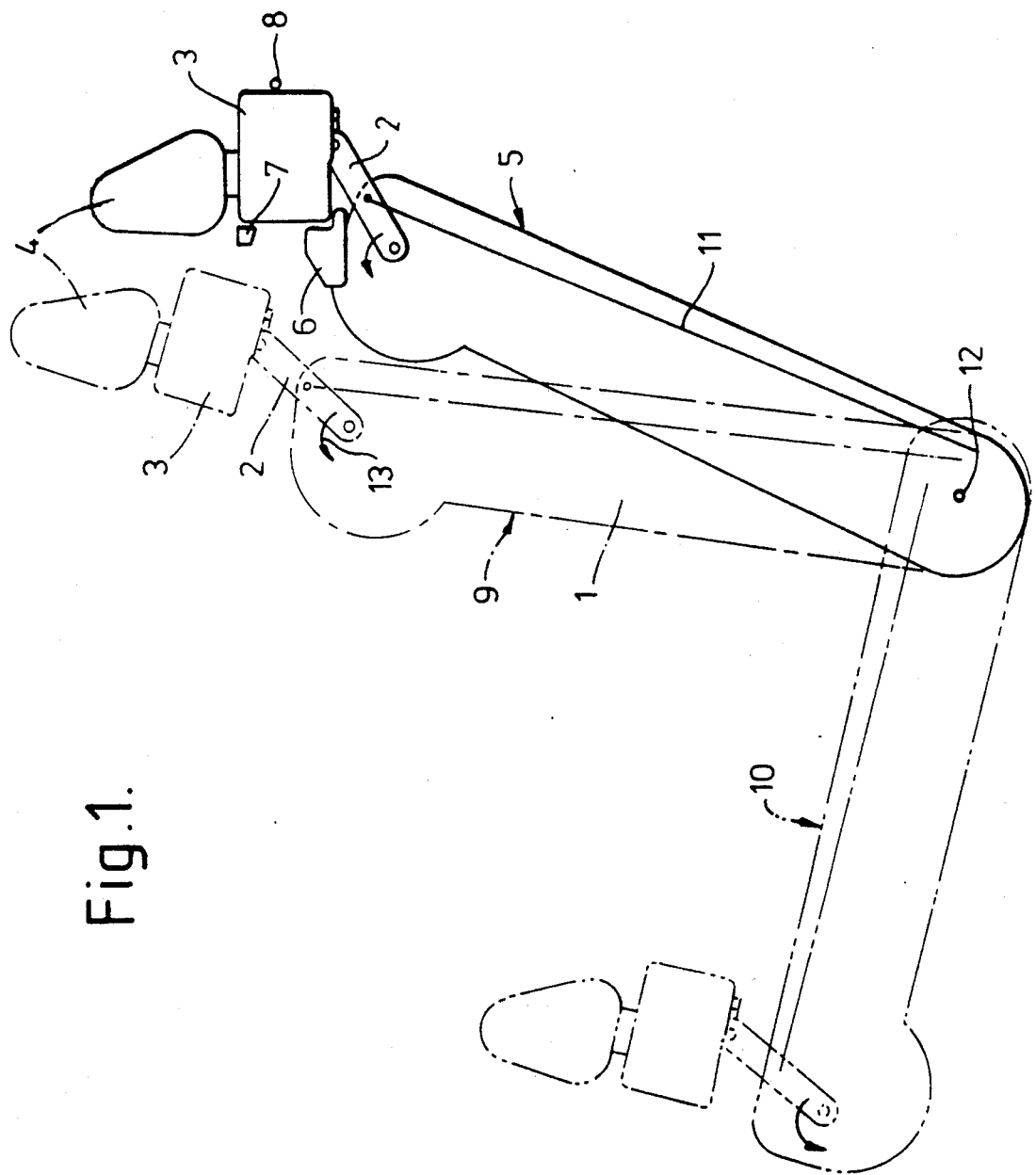

Referring now to FIG. 1 of the accompanying drawings, in one embodiment of the invention a vehicle seat has a back 1 which extends across the entire width of the motor vehicle. Pivotally mounted above the back of the seat 1, by means of two pivot arms 2, is a transversely extending locking beam 3 which extends the entire width of the vehicle. The beam 3 may be pivotally mounted on the pivot arms 2. The pivot arms 2 are pivotally mounted with respect to the seat 1. Mounted on top of the transverse locking beam 3 is a respective head-rest 4, for each person who is to sit on the seat.

The back 1 of the seat may move from a position 5 illustrated in solid lines in which the locking beam 3 engages various abutments 6,7,8 provided at the two sides of the motor vehicle, through a position 9 illustrated in dotted lines, to a forward-most position 10, again indicated in dotted lines. Thus the back of the seat may move from an erect position, when the seat is to be used, to a horizontal position, for example when luggage has to be loaded into the vehicle.

A draw-string 11 or the like may be provided which is fixed in position at one end adjacent the point 12 about which the back of the seat pivots to execute the forward pivoting movement, the draw-string 11 being connected substantially to the mid-point of the pivot arms 2. As the back of the seat is moved forwardly in the described tilting action each pivot arm 2 is caused to rotate in a clock-wise direction (as illustrated) against a spring-bias applied to the pivot arms as indicated by the arrow 13. Thus, when the seat-back 10 is in the forward-most position as illustrated, the locking beam 3 and head-rest 4 no longer project beyond the top of the seat, but are instead effectively located behind the seat. This means that the seat may, when folded down forwardly, occupy a lesser space than it would have occupied if the beam and the head-rest had not been moved pivotally in the manner described.

It is to be appreciated, at this stage, that the locking beam 3 extends transversely across the entire width of the vehicle and engages mirror-image abutments 6, 7 and 8 provided on both sides of the vehicle. The beam 3 is mounted in such a way, and the pivot arms 2 are inter-linked in such a way that the beam 3 can only execute a "parallel motion" and thus the two ends of the beam are always in alignment. The beam thus resists any torsional forces. Consequently, the arrangement is such that the beam is either engaged with the abutments 6, 7 and 8, as described, on both sides of the vehicle, or it is not engaged with the abutments. Thus, when the beam is moved into a "locked" position, the beam is locked at both ends. One or more retractor reels for safety-belts may be mounted on the beam, and under accident circumstances any force transmitted to the retractor reels will be transmitted directly to the beam and thus directly to the abutments 6, 7 and 8. The abutments are designed to withstand the force applied to them in this way.

Preferably any retractor reel mounted on the beam has a vehicle responsive lock to lock the main shaft of the retractor. Such a vehicle responsive lock is usually designed to respond to deceleration of the vehicle, but may also be responsive to inclination of the housing of the retractor. Thus, preferably, the retractor reel or reels are such that if the beam 3 is not in the locking position then the retractor is tilted so that the shaft is locked. This prevents a person putting on the seat-belt if the beam 3 is not in the correct position.

Figure 2:
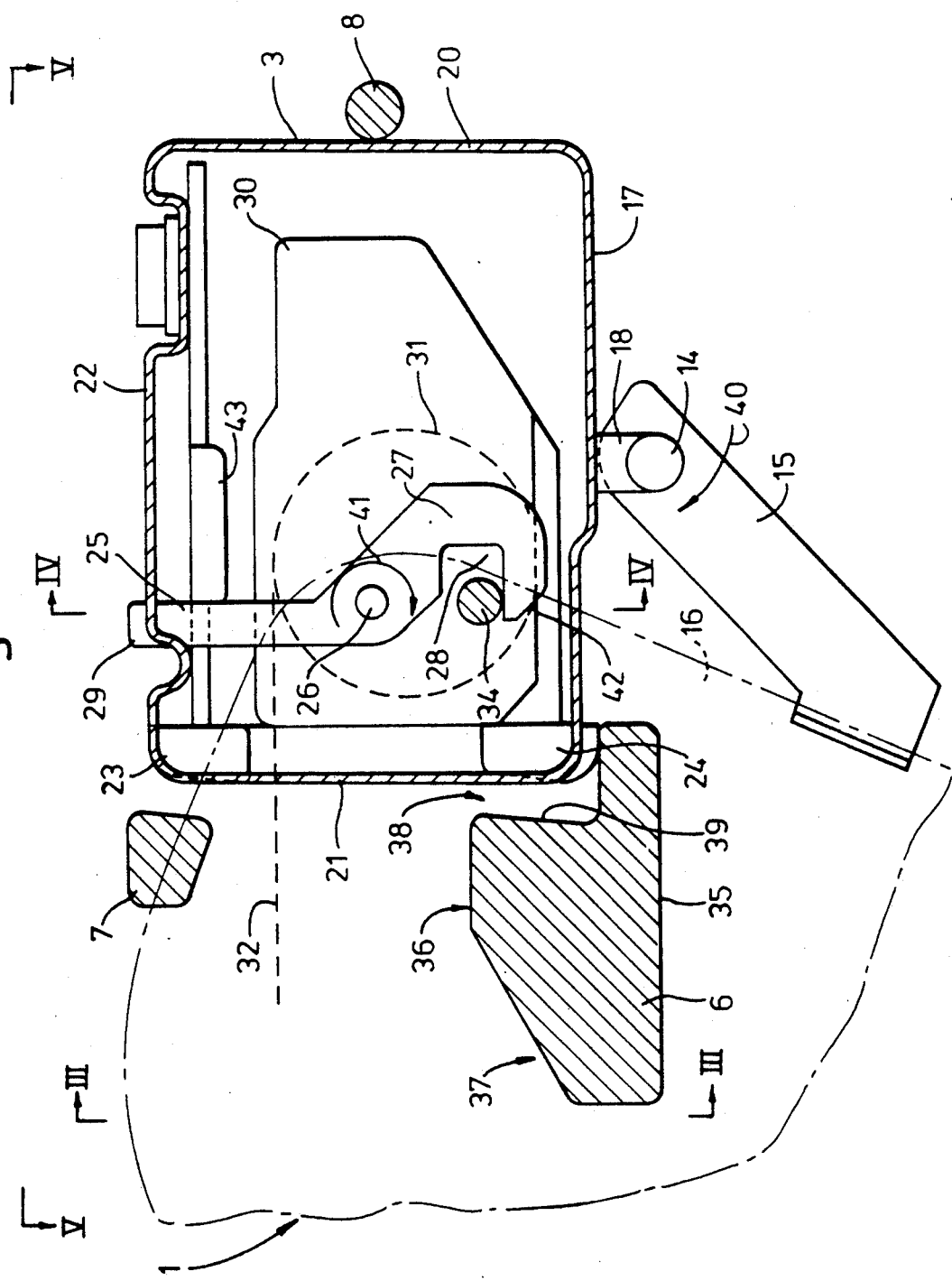

Whilst in the embodiment of FIG. 1 the beam 3 may be mounted on pivot arms 2 and may be provided with a head-rest 4, in another embodiment of the invention, as illustrated in FIG. 2, the locking beam 3 is pivotally mounted, by means of a pivot 14 on two or more brackets 15 which in turn are connected to the back part 16 of the seat-back 1. The beam may have any appropriate form, but may comprise an elongate substantially tubular element formed of metal or the like. The beam, as illustrated, is of generally rectangular form, having a lower horizontal wall 17 which carries, substantially at its centre point, a downwardly extending lug 18 which is pivotally connected about the pivot pin 14. A rear wall 20 extends vertically as does a front wall 21. The rear wall and the front wall are inter-connected by a top wall 22.

The front wall 21 carries, at each end thereof, two axially extending outwardly directed lugs 23,24, the lug 23 being located adjacent the upper wall 22 and the lug 24 being located adjacent the lower wall 17. The lugs may be secured in position in any preferred way, such as by rivetting or welding. Also provided at one end of the beam is an engagement hook 25. The engagement hook 25 is mounted pivotally about a horizontal pivot axis 26 which is parallel with the axis of the beam 3, and comprises a lower hook-shaped portion 27 defining a hook opening 28. The portion above the pivot point 26 forms a handle 29, part of which projects above the top wall 2 of the beam.

Mounted in the beam is at least one retractor mechanism 30, the reel of which 31 is shown in dotted lines, and from which webbing 32 emerges.

As has been mentioned, with reference to FIG. 1 a plurality of abutments 6,7,8 are provided located adjacent each end of the beam 3, the abutments being fixed in position, as can be seen in FIGS. 3 to 5, on a vertical support element 33 which forms part of the chassis of the motor vehicle. A further abutment 34 is also provided at this point.

The abutments 6 and 7 protrude from the support 33 by a distance which is not sufficient for the abutments to come into contact with the beam 3, but nevertheless the abutments 6 and 7 protrude far enough to come into engagement with the projections 23 and 24 provided at each end of the beam. The abutment 6 comprises a protruding element having a horizontal under-surface 35, and an upper surface 36 which defines, at the left-hand end as illustrated in FIG. 2, an upwardly inclined ramp 37, and at the right-hand end a rectangular recess 38 adapted to receive the projection 24. The substantially vertical face of the recess 38, face 39, is inclined slightly towards the right, as compared with the vertical, for a purpose that will be described hereinafter.

The abutment 7 comprises a generally rectangular projection.

The projection 8 (as can be seen from FIG. 3 and FIG. 5) does project far enough to engage the rear face 20 of the beam 3.

The projection 34 is a cylindrical projection which extends far enough from the support 33 to be engaged by the hook 25.

It is to be appreciated that in the embodiment of FIG. 2 a spring-bias may be provided adapted to impart a clock-wise bias to the beam 3 about the pivot point 14 as indicated by the arrow 40. Similarly, a spring-bias may be applied to the hook 25, imparting a clock-wise bias about the pivot point 26 as indicated by the arrow 41. Similarly, it is to be noted that the under-surface of the hook is provided with a chamfered face 42 which may provide a cam action. The top of the hook 29 may engage an abutment 43 provided for that purpose.

It is to be observed that the web 32 emerges, from the beam 33, at a level between the level of the lower abutment 6 and the upper abutment 7.

It is to be appreciated that the beam, when ready for use, is normally in a position, as illustrated in FIG. 2 but with the beam moved slightly towards the left. The projections 23 and 24 on the beam thus come into engagement with the abutments 6 and 7 provided for that purpose. The hook 25 is in engagement with the projection 34.

Since the beam is mounted in a position in which it can only effect a "parallel" movement if the projections 23 and 24 at one end of the beam are in engagement with the abutments 6 and 7, the projections provided at the other end of the beam are also in engagement with the corresponding abutments. The inclined face 39 of the recess 38 defined by the abutment 6 will tend to generate a downward force thus keeping the abutment 24 securely within the recess 38. This resists any tendency for the front of the beam to move upwardly, as it might by virtue of the spring-bias 40.

It is to be appreciated that the spring-bias 40 tends to move the beam out of the locking position, but the hook acts as a secondary locking element to keep the beam in the locking position. Thus, the hook 25 which is engaged with the projection 34, provides a secondary locking effect.

This means that the beam 3 cannot move forwardly by virtue of the engagement of the projections 23 and 24 with the abutments 6 and 7, and also the front part of the beam cannot move upwardly by virtue of the fact that the projection 34 is located within the recess 28 defined by the hook 25. Thus the beam is secured in position. Should an accident arise and any force be applied to the webbing 32 coming from the retractor mechanism 30, that force will be applied to the beam 3 at a position between the two abutments 6 and 7, and thus will not tend to rotate the beam in such a way that the projections 23 and 24 on the beam become disengaged from the abutments 6 and 7.

Figure 6:
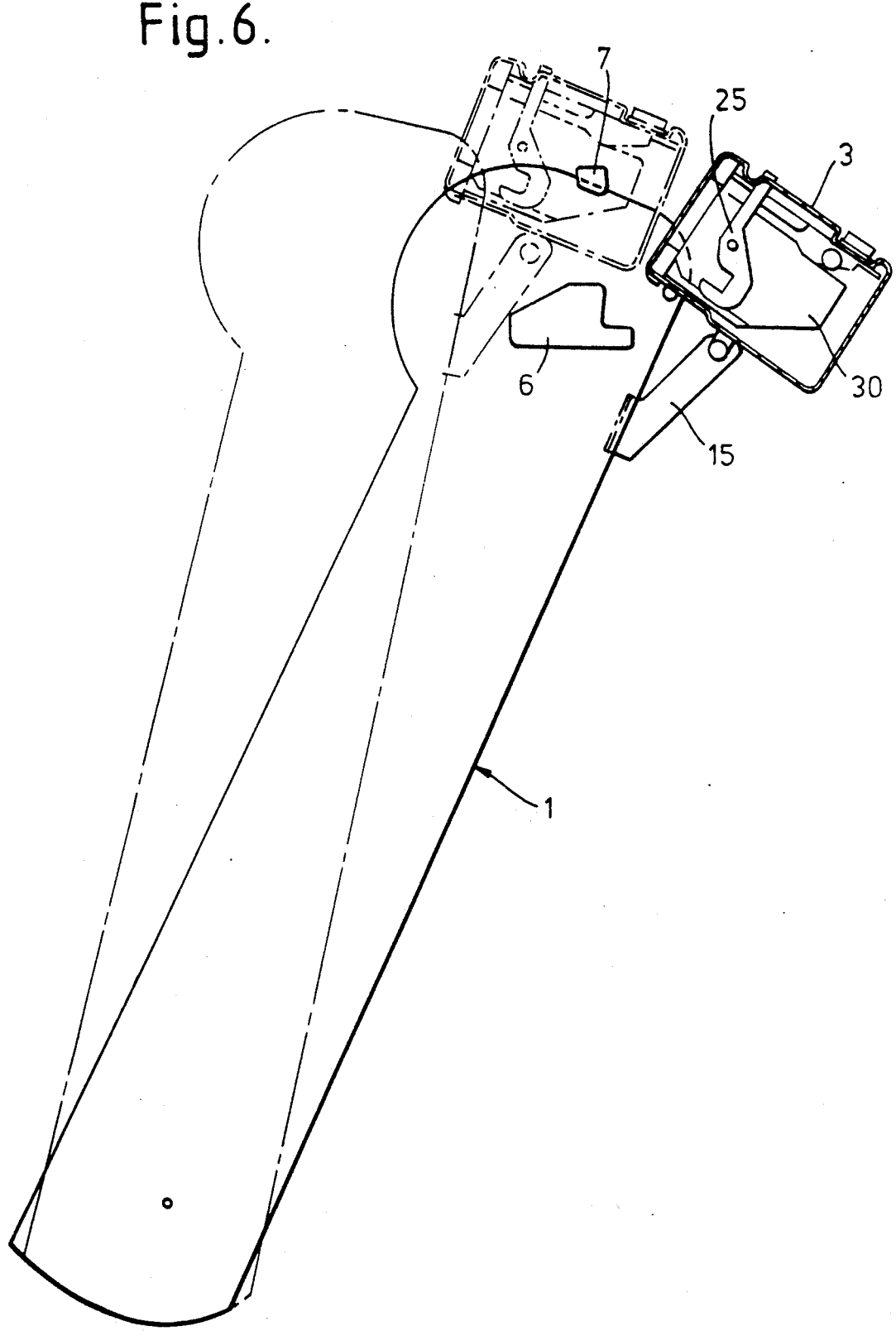

If the beam is to be removed from the locking position, for example to enable the seat upon which the beam is mounted to be folded downwardly, initially the projecting portion 29 of the hook would be moved towards the left as shown in FIG. 2, against the spring-bias 41, thus disengaging the hook recess 28 from the projection 34. The beam may be moved rearwardly slightly until the rear face of the beam 3 engages the abutment 8. The front part of the beam may then, because the hook-shaped portion 27 is no longer engaged with the projection 34, be moved upwardly slightly, pivoting the beam about the pivot point 14 and simultaneously moving the back of the seat slightly forwardly with a tilting movement. When the projections 24 and 23 are no longer aligned with the abutments 6 and 7, the beam may be moved forwardly, with the projection 24 passing between the abutments 6 and 7. This forward movement is illustrated in FIG. 6. The entire back of the seat may then be folded downwardly.

When the seat is moved from the forwardly folded position to the upright position, the beam 3 will have been moved in a pivotal sense by the spring-bias indicated by the arrow 40. The beam 3 will thus be in such a position that the projection 24 will pass between the abutments 6 and 7. If the beam is not in precisely the correct position, the projection 24 will most probably engage the inclined or ramp surface 37 provided on the top of the abutment 6, which will move the beam 3 pivotally about the pivot axis 14 until the beam has the correct orientation for the projections 23 and 24 to pass the abutments 6 and 7. The rear face 3 of the beam will then engage the abutment 8.

The position of the abutment 8 is such that continuing rearward movement of the back 1 of the seat will cause the beam 3 to pivot about the pivot axis 14 against the spring-bias 40. As the beam does pivot in this way, the hook 25 effectively moves downwardly and the cam or ramp surface 42 on the under-side of the hook engages the projection 34, moving the hook against the spring-bias 41 until the projection 34 is substantially aligned with the hook recess 28 when the spring-bias 41 returns the hook to the latched condition illustrated in FIG. 2. Thus, the secondary locking element, the hook 25, is positioned automatically. The beam may then be moved slightly forwardly until the projections 23 and 24 again engage the abutments 6 and 7, the beam then again being in the latched position.

FIGS. 7 to 9 illustrate an alternative embodiment of the invention. In this embodiment the beam 3 consists of an elongate hollow tubular metal member of substantially rectangular section. The beam is mounted on a lug 18 which is pivotally connected to a bracket 15 adapted to be connected to the back of the seat.

One end of the beam is provided with a plate 49 which defines a rearwardly open recess 50. (Alternatively both ends of the beam are provided with a plate 49 and the associated components now to be described). Pivotally mounted on the plate 49 are two catch elements 51,52. The first catch element 51 is pivotally mounted to rotate about a horizontal axis 53 and defines an upwardly open recess 54. The catch element 51 has an arcuate face 55, the centre of curvature of which is co-aligned with the pivot axis 53. The face 55 terminates with a step 56. The second catch element 52 is pivotally mounted to rotate about a pivot axis 57 and has an arcuate face 58 which abuts the arcuate face 55 of the first catch element. The second catch element is provided with an outwardly projecting operating lever 59.

The first catch element 51 is spring-biassed to rotate in an anti-clockwise direction and the second catch element 52 is spring-biassed to rotate in a clockwise direction. It is to be noted that in the initial position, illustrated in FIG. 7, a projection 60 formed on the second catch element underlies part of the first catch element preventing the first catch element from rotating any further in the anti-clockwise direction. Any appropriate form of strap may be provided to limit the movement of either of the catch elements.

A plate 61 is provided adapted to be mounted to the chassis of the motor vehicle, the plate 61 carrying two inwardly directed projections 62,63. The plate is mounted in a position where it can engage the described formation present at the end of the locking beam 3. When the locking beam 3 is brought into the locking position the beam is moved from the position illustrated in FIG. 7 to the position illustrated in FIG. 8. The two catch members 51 and 52 move between the projections 62 and 63. The projection 62 engages the recess 50 formed in the plate 49, as shown in FIG. 8. The further rearward movement of the seat will cause the locking beam 3 to pivot about the axis defined by the projection 62. The projection 63 thus enters the upwardly open mouth of the recess 54. Continuing upward movement of the beam 3 causes the catch element 51 to rotate in a clockwise direction against the spring bias. The arcuate face 55 of the catch element 51 moves past the arcuate face 58 of the catch element 52 until the two arcuate faces have totally passed each other. The catch element 52 then rotates, under its spring bias, in a clockwise direction bringing the portion defining the end of the arcuate face 58 into engagement with the recess 56 provided on the first catch element 51. The catch elements are thus effectively locked in position, as shown in FIG. 9. The beam 3 is thus retained firmly in position, but can be released by pressing the operating lever 59 forwardly, thus disengaging the second catch element from the first catch element, which permits the beam 3 to be pivoted downwardly about the axis defined by the projection 62. The first catch element 51 is then returned to its initial position under the implied spring bias. Thus the beam is returned to the position illustrated in FIG. 8, and the beam can then be moved forwardly to disengage the projection 62 from the recess 50.

Whilst the invention has been described with reference to particular preferred embodiments it is to be appreciated that many modifications may be effected without departing from the scope of the invention. For example, the beam may be spring-biassed into the locking position, with no secondary locking means such as the hook 25, or the catches 51,52 instead of being biassed out of the locking position. Also, two hooks 25 may be provided, one at each end of the beam, or two sets of catch elements 51,52.

What is claimed is:

1. A locking mechanism for the back of a vehicle seat, the back of the seat being adapted to be moved from a substantially upright operative position to a forwardly tilted inoperative position, the locking mechanism being adapted to lock the back of the seat in the operative position, the locking mechanism comprising a locking element extending substantially across the whole width of a vehicle in which the seat is fitted, and being mounted on the back of the seat, the locking element having means adapted to engage abutments located on each side of the motor vehicle, the locking element being pivotably movable relative to the back of the seat between a locking position and a release position, the locking element, when in the locking position, engaging the abutments provided on each side of the vehicle, and further including a retractor mechanism mounted on the locking element to move therewith.

2. A mechanism according to claim 1 wherein the locking element consists of a cross-beam pivotally mounted on the back of the seat, the pivot axis being parallel to the beam so that the beam can only move in parallelism with the pivot axis thereof.

3. A mechanism according to claim 2 wherein the locking element is spring-biassed towards its locked position.

4. A mechanism according to claim 2 wherein the locking element is spring-biassed towards its released position, and a secondary locking means is provided to prevent the locking element from moving to its released position.

5. A mechanism according to claim 4 wherein the secondary locking means comprises a hook-like member engageable with a respective abutment.

6. A mechanism according to claim 4 wherein the secondary locking means comprises a first catch element adapted to move pivotally to a position in which it engages one of said abutments and a second catch element adapted to retain the first catch element in the abutment engaging position.

7. A mechanism according to claim 1 wherein each end of the movable locking element is provided with two projections, each side of the vehicle being provided with two spaced abutments, each abutment being adapted to engage a respective projection.

8. A mechanism according to claim 7 wherein at least one of said two spaced abutments is provided with an inclined face adapted to engage a corresponding one of the projections in order to retain the beam in the locking condition.

9. A mechanism according to claim 7 wherein a further abutment is provided on each side of the vehicle engageable with a rear face of the locking element and adapted to tilt the locking element into the locking position.

10. A mechanism according to claim 9 wherein a webbing strap from the retractor mechanism passes between said two spaced abutments.

11. A mechanism according to claim 1 wherein the locking element is pivotally mounted on two pivot arms which are pivotally mounted on the back of the seat.

12. A mechanism according to claim 11 wherein means are provided for adjusting the angle between the pivot arms and the back of the seat when the back of the seat is tilted forwardly.

13. A mechanism according to claim 1 wherein a head-rest is mounted on the locking element.

* * * * *